United States Patent [19]

Cenker et al.

[11] 4,051,082
[45] Sept. 27, 1977

[54] CARBODIIMIDE-ISOCYANURATE FOAMS MODIFIED WITH ETHOXYLATED POLYOLS

[75] Inventors: Moses Cenker, Trenton, Mich.; Peter Tai-Yuen Kan, Plymouth, Mich.

[73] Assignee: BASF Wyandotte Corporation, Wyandotte, Mich.

[21] Appl. No.: 654,445

[22] Filed: Feb. 2, 1976

[51] Int. Cl.$^2$ .................................................. C08G 18/50
[52] U.S. Cl. ...................... 260/2.5 AR; 260/2.5 AW; 260/2.5 BF
[58] Field of Search ................. 260/2.5 BF, 2.5 AW, 260/2.5 AR

[56] References Cited

U.S. PATENT DOCUMENTS

| | | | |
|---|---|---|---|
| 3,772,217 | 11/1973 | Kan | 260/2.5 AW |
| 3,876,568 | 4/1975 | Wysocki | 260/2.5 AW |
| 3,891,578 | 6/1975 | Kan | 260/2.5 AW |
| 3,894,972 | 7/1975 | Narayan | 260/2.5 BF |
| 3,922,238 | 11/1975 | Narayan | 260/2.5 BF |
| 3,928,256 | 12/1975 | Cenker | 260/2.5 BF |
| 3,931,065 | 1/1976 | Ashida | 260/2.5 AW |
| 3,933,694 | 1/1976 | Wysocki | 260/2.5 AW |
| 3,969,288 | 7/1976 | Cenker | 260/2.5 AW |
| 3,994,839 | 11/1976 | Cenker | 260/2.5 BF |

*Primary Examiner*—C. Warren Ivy
*Attorney, Agent, or Firm*—Joseph D. Michaels; Bernhard R. Swick; Robert E. Dunn

[57] ABSTRACT

Rigid cellular foams are prepared by catalytically condensing an organic polyisocyanate in the presence of (a) a carbodiimide-promoting catalyst, (b) a trimerization catalyst, (c) a urethane catalyst, and (d) from 10 parts to 40 parts per 100 parts of polyisocyanate of a polyol mixture comprising (1) from 5 parts to 30 parts of a polyoxyethylated polyhydric alcohol and (2) from 5 parts to 25 parts of a polyoxyethylated phosphate polyol.

10 Claims, No Drawings

CARBODIIMIDE-ISOCYANURATE FOAMS MODIFIED WITH ETHOXYLATED POLYOLS

BACKGROUND OF THE INVENTION

1. Field Of The Invention

The present invention relates to cellular foams characterized by carbodiimide, isocyanurate and urethane linkages. More particularly, the invention relates to foams prepared by catalytically condensing an organic polyisocyanate in the presence of certain catalysts and combinations of polyoxyethylated polyols.

2. Prior Art

The preparation of foams characterized by carbodiimide, isocyanurate and urethane linkages by catalytically condensing an organic polyisocyanate in the presence of a primary hydroxy-terminated polyol is described in U.S. Pat. No. 3,922,238. The resulting foams exhibit acceptable strength properties and flame retardancy at lower levels of polyol use. While the strength properties of these foams may be further improved by increasing the ratio of polyol to isocyanate, this in turn causes a reduction in flame retardancy. The present invention is directed to an improvement in the process and compositions described in U.S. Pat. No. 3,922,238.

SUMMARY OF THE INVENTION

In accordance with the subject invention, foams of superior properties at the heretofore normal polyol use levels and at higher levels without loss in flame retardancy can be obtained by catalytically condensing an organic polyisocyanate in the presence of from 10 parts to 40 parts per 100 parts of polyisocyanate of a polyol mixture comprising (1) from 5 parts to 30 parts of a polyoxyethylated polyhydric alcohol and (2) from 5 parts to 25 parts of a polyoxyethylated phosphate polyol. The use of higher levels of polyol provides the additional advantage of allowing a more balanced resin-isocyanate ratio for metering of foam components.

DESCRIPTION OF THE PREFERRED EMBODIMENTS

The present invention relates to cellular foams prepared by the catalytic condensation of an organic polyisocyanate in the presence of certain catalysts and ethoxylated polyols. Polyoxyethylated polyhydric alcohols which may be employed in the subject invention are well known in the art. They are prepared by the reaction of ethylene oxide with a polyhydric alcohol having from two to eight hydroxyl groups. Representative polyhydric alcohols include ethylene glycol, propylene glycol, diethylene glycol, dipropylene glycol, butylene glycol, 1,5-pentanediol, 1,6-hexanediol, glycerol, trimethylolpropane, 1,2,6-hexanetriol, pentaerythritol, sorbitol, sucrose and alkyl glucosides. The polyoxyethylated polyols generally have an average equivalent weight of from about 150 to 1500. The amount of polyoxyethylated polyhydric alcohol employed in the subject invention is generally from about 5 parts to 30 parts per 100 parts of polyisocyanate.

Polyoxyethylated phosphate polyols which may be employed in the subject invention are also well known in the art. They are prepared by the reaction of ethylene oxide with acids of phosphorus. Acids of phosphorus which may be used are acids having a $P_2O_5$ equivalency of from about 72% to about 95% as typified by 100% phosphoric acid, 105% phosphoric acid, 115% phosphoric acid, orthophosphoric acid, pyrophosphoric acid, polyphosphoric acid, partial esters of these acids and mixtures thereof. The polyoxyethylated phosphate polyols generally have an average equivalent weight of from about 125 to 300. The amount of polyoxyethylated polyhydric alcohol employed in the subject invention is generally from about 5 parts to 25 parts per 100 parts of polyisocyanate.

As mentioned above, the catalyst system employed in the present invention comprises a compound which promotes carbodiimide linkages, a trimerization catalyst and a urethane catalyst. Representative compounds which promote carbodiimide linkages include aliphatic alcohols such as methyl alcohol and furfuryl alcohol; amino alcohols having a molecular weight of from 89 to 304 such as N,N-dialkylaminoalkanols, triethanolamine, N-2-hydroxyethylmorpholine and N,N,N',N'-tetrakis(2-hydroxypropyl) ethylene diamine and s-triazine compounds such as 2,4,6-tris(diethanolamino)-s-triazine, 2,4,6-tris(diisopropanolamino)-s-triazine, 2,4,6-tris(N-methylethanolamino)-s-triazine, and unsymmetrically substituted triazines of the formula:

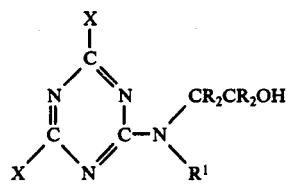

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpiperazyl. Since the triazines are unsymmetrically substituted, it is apparent that each X cannot concurrently be

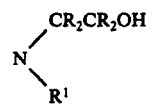

wherein each R and $R^1$ is the same. Generally from about 0.1 part to 10 parts of carbodiimide-promoting compound per 100 parts of organic polyisocyanate will be employed in the subject invention.

Trimerization catalysts which are employed in the present invention include 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; 2,4,6-tris(dimethylaminomethyl)-phenol; o-, p-or a mixture of o- and p-dimethylaminomethylphenol and triethylene diamine or the alkylene oxide and water adducts thereof, alkali metal carboxylates, alkali metal carboxylates, alkali metal alkoxides, and organic boron-containing compounds. These compounds are well known in the art, as is their use of catalysts which promote isocyanurate linkages.

1,3,5-Tris(N,N-dialkylaminoalkyl)-s-hexahydrotriazine compounds have heretofore been described as useful isocyanate trimerization catalysts. See U.S. Pat. No. 3,723,366, the disclosure of which is hereby incorporated by reference. Preferred within this group of hexahydrotriazine compounds is 1,3,5-tris(N,N-dimethylaminopropyl)-s-hexahydrotriazine.

The alkylene oxide and water adducts of a 1,3,5-tris(N,N-dialkylaminoalkyl)-s-hexahydrotriazine are presumably quaternary ammonium hydroxides. These compounds are generally prepared by reacting equimolar amounts of the hexahydrotriazine, alkylene oxide and water at a temperature of from about 10° C. to 80° C. for a period of from about 5 minutes to 2 hours. Preferred within this group of compounds is the propylene oxide and water adduct of 1,3,5-tris(N,N-dimethylaminopropyl)-s-hexahydrotriazine. See U.S. Pat. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)-phenol are known compounds which are commercially available products sold by Rohm & Haas under the trade names DMP-30 and DMP-10. Triethylenediamine and the alkylene oxide and water adducts thereof are also well known.

The amount of trimerization catalyst which may be employed in the present invention is generally from 0.1 part of 20 parts of catalyst per 100 parts of organic polyisocyanate.

Urethane catalysts which are employed in the present invention are well known in the art and include the metal or organometallic salts of carboxylic acid and teritiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01 part to 10 parts per 100 parts of organic polyisocyanate.

The organic polyisocyanate used in the preparation of the foams in accordance with the present invention corresponds to the formula:

wherein R″ is a polyvalent organic radical which is either aliphatic, aralkyl, alkaryl, aromatic or mixtures thereof, and z is an integer which corresponds to the valence of R″ and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4′,4″-triphenylmethane triisocyanate, 2,4,6-toluene triisocyanates; the aromatic tetraisocyanates, such as 4,4′-dimethyldiphenylmethane-2,2′-5,5′-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4′-biphenylene diisocyanate, 3,3′-dimethoxy-4,4′-biphenyl diisocyanate, 3,3′-dimethyl-4,4′-biphenyl diisocyanate, and 3,3′-dimethyldiphenylmethane-4,4′-diisocyanate.

These polyisocyanates are prepared by conventional methods known in the art such as the phosgenation of the corresponding organic amine.

Still another class of organic polyisocyanates contemplated for use herein are the so-called "quasiprepolymers". These quasi-prepolymers are prepared by reacting an excess of organic polyisocyanate or mixtures thereof with a minor amount of an active hydrogen containing compound as determined by the well-known Zerewitinoff test, as described by Kohler in Journal Of The American Chemical Society, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include -OH, -NH-, -COOH, and -SH. Examples of suitable types of organic compounds containing at least two active hydrogen-containing groups which are reactive with an isocyanate group are hydroxyl terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more -SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one -SH group and one -OH group as well as those which contain an amino group and a -SH group.

Any suitable hydroxyl-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two -SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used.

The carbon dioxide-blown foams of the present invention are prepared by mixing together the organic polyisocyanate, the polyols, and the catalysts at an initiating temperature which, depending on the catalyst, will range from about 0° C. to 50° C. Under such conditions almost immediately an exotherm is developed within the reaction system, carbon dioxide is generated and foam formation begins. Alternatively, the foams may be prepared by adding the polyols and the catalysts to the mixture of polyisocyanate and an auxiliary blowing agent.

The present invention also contemplates the incorporation of additional ingredients in the foam formulation to tailor the properties thereof. Thus, plasticizers, such as tris(2-chloroethyl) phosphate, surfactants, such as the silicone surfactants, e.g., alkylpolysiloxanes and polyalkyl siloxanes, may be employed in the invention. Further additional ingredients include auxiliary or supplemental blowing agents, such as water or halohydrocarbons. Also, inorganic fillers, pigments and the like can be used.

In any event, the foams prepared in accordance herewith are rigid cellular products having a density of from about one pound to 40 pounds per cubic foot which exhibit excellent flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621, the flame retardant properties by ASTM D-3014 and the friability properties by ASTM C-421. In the examples which follow, the following abbreviations are employed:

TDI — a mixture of 80/20 by weight 2,4-, 2,6-tolylene diisocyanate
PAPI — polymethylene polyphenyl isocyanate
TDH — 1,3,5-tris(N,N-dimethylaminopropyl)hexahydrotriazine
DBTDA — dibutyltin diacetate
FA — furfuryl alcohol
DC-193 — polyalkyl siloxane-polyoxyalkylene copolymer, a foam stabilizer
F-11B — trichlorofluoromethane Polyol A — A polyol prepared by the reaction of ethylene oxide with 115% phosphoric acid, said polyol having an equivalent weight of 200.

Polyol B — A polyol prepared by the reaction of ethylene oxide with 100% phosphoric acid, said polyol having an equivalent weight of 171.

Polyol C — A polyol prepared by the reaction of ethylene oxide with 115% phosphoric acid, said polyol having an equivalent weight of 208.

Polyol D — A polyol prepared by the reaction of ethylene oxide with 100% phosphoric acid, said polyol having an equivalent weight of 150.

Polyol I — A polyol prepared by the reaction of ethylene oxide with trimethylolpropane, said polyol having an equivalent weight of 250.

Polyol II — A polyol prepared by the reaction of ethylene oxide with trimethylolpropane, said polyol having an equivalent weight of 500.

Polyol III — A polyol prepared by the reaction of ethylene oxide with ethylene glycol, said polyol having an equivalent weight of 200.

Polyol IV — A polyol prepared by the reaction of ethylene oxide with ethylene glycol, said polyol having an equivalent weight of 150.

EXAMPLE I

A series of foams was prepared by simultaneously adding various polyols and catalysts to a reaction vessel equipped with a high speed stirrer to which had been charged a polyisocyanate. An exotherm was generated and foam formation followed soon after. In each preparation, in addition to the polyols, 0.3 part of DBTDA, 1 part of FA and 3 parts of TDH were employed per 100 parts of PAPI. Table I, below, lists the foams prepared as well as the physical properties of the resulting foams. As the data in the Table clearly illustrate, the use of a combination of polyols in the preparation of foams resulted in foams of improved physical properties without loss in flame retardancy. It was only through use of a combination of polyols in accordance with the subject invention that foams having both aforesaid properties were obtained.

TABLE I

| | | Physical Properties | | | |
|---|---|---|---|---|---|
| | | Comp. Str., 10% Defl., psi. | Tumb. Friab. % Wt. Loss | Butler Chimney Test | |
| Foam | Polyol, pbw. | | | Wt. Ret. % | Flame Ht. In. |
| A | A 20 | 9 | 70 | 95 | 5 |
| B | I 20 | 31 | 26 | 90 | 8 |
| C | A 5 I 15 | 22 | 17 | 97 | 6 |
| D | A 25 | 8 | 60 | 95 | 5 |
| E | I 25 | 20 | 21 | 88 | 10 |
| F | A 10 I 15 | 19 | 15 | 94 | 6 |

EXAMPLES II-VII

A series of foams was prepared by simultaneously adding various polyols and catalysts to a reaction vessel equipped with a high speed stirrer to which had been charged 100 parts of PAPI, 1 part of FA, 3 parts of TDH, 0.3 part of DBTDA, 1 part of DC-193 and 20 parts of F-11B. An exotherm was generated and foam formation followed. Generally, the mixture foamed in two to ten seconds and was tack-free in 100–130 seconds. All foams exhibited a density of about 2.0 pounds per cubic foot. Further details of the preparations as well as physical properties of the resulting foams are presented in Table II, below.

TABLE II

| Example | Polyol, pbw. | Comp. Str., 10% Defl., psi. | Tumb. Friab. % Wt. Loss | Butler Chimney Test | |
|---|---|---|---|---|---|
| | | | | Wt. Ret. % | Flame Ht. In. |
| II | A 5 I 25 | 22 | 6 | 92 | 8 |
| III | A 15 I 25 | 20 | 0.3 | 82 | 9 |
| IV | A 5 I 30 | 24 | 4 | 86 | 8 |
| V | A 5 II 25 | 20 | 12 | 94 | 5 |
| VI | A 10 II 25 | 19 | 10 | 90 | 6 |
| VII | A 10 II 30 | 19 | 5 | 91 | 6 |

EXAMPLES VIII-XVIII

A series of foams was prepared by condensing various quasi-prepolymers in the presence of 0.3 part of DBTDA, 1 part of FA, 3 parts of TDH and 1 part of DC-193. The prepolymers were prepared by the sequential addition of first Polyol II and then Polyol B to the polyisocyanate. During the addition of Polyol B to the polyisocyanate the temperature of the reaction climbed to 40° C. During the addition of Polyol II the reaction temperature climbed to 65° C. Upon completion of the reaction, the reaction mixture was stirred for three hours. The free isocyanate content of the resulting quasiprepolymers varied from 20% to 24%. Details of the foam preparations and physical properties of the foams are presented in Table III, below.

TABLE III

| Example | Polyol, pbw. | Comp. Str., 10% Defl., psi. | Tumb. Friab. % Wt. Loss | Butler Chimney Test | |
|---|---|---|---|---|---|
| | | | | Wt. Ret. % | Flame Ht. In. |
| VIII | B 10 I 5 | 16 | 15 | 94 | 4 |
| IX | B 15 I 5 | 13 | 9 | 89 | 5 |
| X | B 5 I 10 | 19 | 14 | 94 | 4 |

TABLE III-continued

| Example | Polyol, pbw. | Comp. Str., 10% Defl., psi. | Tumb. Friab. % Wt. Loss | Butler Chimney Test Wt. Ret. % | Flame Ht. In. |
|---|---|---|---|---|---|
| XI | B 5<br>I 15 | 23 | 9 | 92 | 5 |
| XII | B 10<br>I 15 | 18 | 7 | 92 | 5 |
| XIII | B 5<br>I 20 | 15 | 9 | 91 | 6 |
| XIV | B 15<br>II 5 | 18 | 14 | 92 | 5 |
| XV | B 10<br>II 10 | 23 | 13 | 94 | 5 |
| XVI | B 5<br>II 15 | 28 | 23 | 94 | 5 |
| XVII | B 10<br>II 15 | 17 | 12 | 93 | 4 |
| XVIII | B 5<br>II 20 | 22 | 13 | 95 | 5 |

EXAMPLES XIX-XXVIII

A series of foams was prepared by condensing various quasi-prepolymers in the presence of 0.3 part of DBTDA, 1 part of FA, 3 parts of TDH and 1 part of DC-193. The prepolymers were prepared by charging various ratios of PAPI and TDI to a reaction vessel and with stirring adding thereto Polyol I over a 40 minute to 60 minute period at 25° C.-40° C. The stirring was continued and the reaction mixture heated to 100° C. for 1 hour. The resulting product was then reacted at 70° C. with Polyol B in the manner indicated above. The free isocyanate content of the resulting quasi-prepolymers varied from 22% to 30%. Details of the foam preparations and physical properties of the foams are presented in Table IV, below.

TABLE IV

| Example | PAPI | TDI | Polyol B | Polyol I | F-11B | Compr. Str. 10% Defl. psi. | Tumb. Friab. % Wt. Loss | Butler Chimney Test Wt. Ret. % | Flame Ht. in. |
|---|---|---|---|---|---|---|---|---|---|
| XIX | 80 | 20 | 5 | 5 | 14 | 20 | 25 | 93 | 5 |
| XX | 80 | 20 | 5 | 10 | 13 | 35 | 16 | 91 | 6 |
| XXI | 80 | 20 | 5 | 15 | 15 | 19 | 10 | 89 | 6 |
| XXII | 80 | 20 | 5 | 20 | 16 | 18 | 4 | 87 | 7 |
| XXIII | 80 | 20 | 15 | 5 | 16 | 19 | 8 | 91 | 6 |
| XXIV | 80 | 20 | 15 | 15 | 21 | 14 | 2 | 85 | 8 |
| XXV | 80 | 20 | 25 | 5 | 22 | 11 | 3 | 85 | 7 |
| XXVI | 70 | 30 | 5 | 10 | 12 | 22 | 16 | 90 | 6 |
| XXVII | 70 | 30 | 5 | 15 | 14 | 24 | 8 | 89 | 6 |
| XXVIII | 70 | 30 | 5 | 20 | 17 | 25 | 4 | 85 | 8 |

EXAMPLES XXIX-XXXXVIII

A series of foams was prepared by simultaneously adding various polyols and catalysts to a reaction vessel equipped with a high speed stirrer to which had been charged 100 parts of PAPI, 1 part of FA, 3 parts of TDH, 0.3 part of DBTDA, 1 part of DC-193 and 12 parts of 14 parts of F-11B. An exotherm was generated and foam formation followed. All foams exhibited a density of about 2.0 pounds per cubic foot. Further details of the preparations as well as physical properties of the resulting foams are presented in Table V, below.

TABLE V

| Example | Polyol, pbw. | Comp. Str., 10% Defl., psi. | Tumb. Friab. % Wt. Loss | Butler Chimney Test Wt. Ret. % | Flame Ht. In. |
|---|---|---|---|---|---|
| XXIX | C 5<br>III 5 | 20 | 28 | 95 | 6 |
| XXX | C 5<br>III 10 | 19 | 23 | 94 | 6 |
| XXXI | C 5<br>III 25 | 16 | 8 | 85 | 9 |
| XXXII | C 10<br>III 5 | 13 | 5 | 92 | 6 |
| XXXIII | C 10<br>III 10 | 12 | 15 | 88 | 8 |
| XXXIV | C 5<br>IV 5 | 21 | 30 | 93 | 6 |
| XXXV | C 5<br>IV 10 | 13 | 15 | 89 | 7 |
| XXXVI | C 10<br>IV 5 | 14 | 27 | 91 | 8 |
| XXXVII | C 15<br>IV 15 | 13 | 9 | 92 | 10 |
| XXXVIII | D 5<br>III 5 | 22 | 25 | 95 | 4 |
| XXXIX | D 5<br>III 10<br>D 5 | 11 | 17 | 93 | 6 |

TABLE V-continued

| Example | Polyol, pbw. | Comp. Str., 10% Defl., psi. | Tumb. Friab. % Wt. Loss | Butler Chimney Test Wt. Ret. % | Butler Chimney Test Flame Ht. In. |
|---|---|---|---|---|---|
| XXXX | III 15 / D 10 | 24 | 7 | 92 | 7 |
| XXXXI | III 5 / D 10 | 18 | 18 | 89 | 6 |
| XXXXII | III 15 / D 15 | 22 | 3 | 85 | 8 |
| XXXXIII | III 15 / D 5 | 23 | 6 | 85 | 10 |
| XXXXIV | IV 5 / D 5 | 22 | 37 | 92 | 5 |
| XXXXV | IV 10 / D 5 | 9 | 23 | 92 | 6 |
| XXXXVI | IV 15 / D 10 | 12 | 16 | 90 | 6 |
| XXXXVII | IV 5 / D 10 | 14 | 16 | 88 | 6 |
| XXXXVIII | IV 15 | 17 | 9 | 84 | 8 |

The embodiments of the invention in which an exclusive property of privilege is claimed are defined as follows:

1. A cellular foam characterized by carbodiimide, isocyanurate and urethane linkages prepared by catalytically condensing an organic polyisocyanate in the presence of (a) a carbodiimide-promoting catalyst; (b) a trimerization catalyst; (c) a urethane catalyst, and (d) from 10 parts to 40 parts by weight per 100 parts by weight of polyisocyanate of a polyol mixture comprising (1) from 5 parts to 30 parts of a polyoxyethylated polyhydric alcohol and (2) from 5 parts to 25 parts of an ethoxylated acid of phosphorus, said acid having a $P_2O_5$ equivalency of from about 72% to about 95% by weight.

2. The foam of claim 1 wherein the polyoxyethylated polyhydric alcohol is an ethylene oxide adduct of ethylene glycol.

3. The foam of claim 1 wherein the polyoxyethylated polyhydric alcohol is an ethylene oxide adduct of trimethylolpropane.

4. The foam of claim 1 wherein the ethoxylated acid of phosphorus is an ethylene oxide adduct of 100% phosphoric acid.

5. The foam of claim 1 wherein the ethoxylated acid of phosphorus is an ethylene oxide adduct of 115% phosphoric acid.

6. The foam of claim 1 wherein the organic polyisocyanate is selected from the group consisting of toluene diisocyanate, methylene diphenyl diisocyanate, polyphenyl polymethylene polyisocyanate and mixtures thereof.

7. The foam of claim 1 wherein the carbodiimidepromoting catalyst is furfuryl alcohol.

8. The foam of claim 1 wherein the trimerization catalyst is 1,3,5-tris(N,N-dimethylaminopropyl)-s-hexahydrotriazine.

9. The foam of claim 1 wherein the urethane catalyst is dibutyltin diacetate.

10. The foam of claim 1 carried out in the presence of a fluorocarbon blowing agent.

* * * * *